Sept. 15, 1959  B. B. ASHEIM ET AL  2,904,197
SELF-PROPELLED MECHANICAL PARKING MECHANISM WITH ELEVATOR
Filed July 13, 1954  5 Sheets-Sheet 1

INVENTORS
Victor K. Mayer
BY Bernard B. Asheim
Atty.

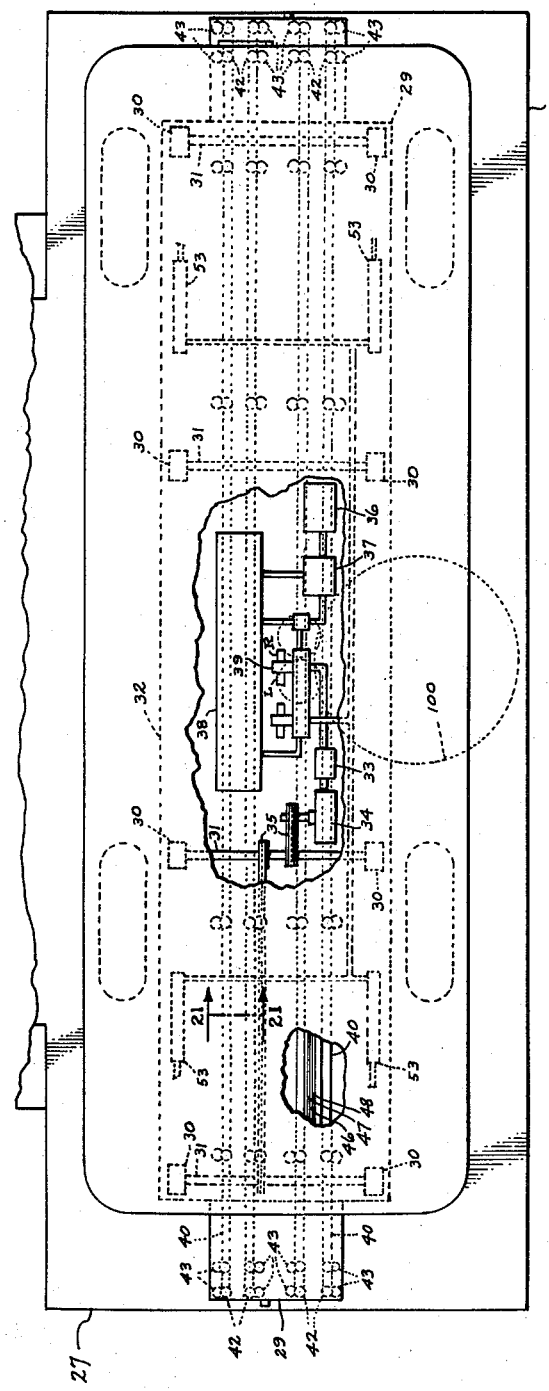
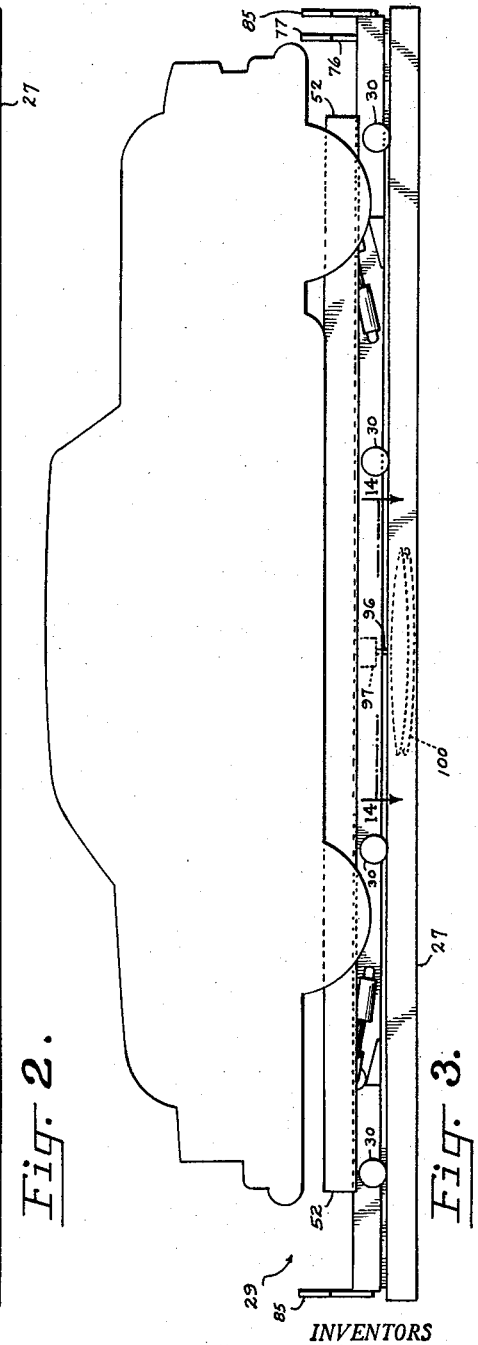
Fig. 2.
Fig. 3.
INVENTORS
Victor K. Mayer
BY Bernard B. Asheim
Atty.

Sept. 15, 1959  B. B. ASHEIM ET AL  2,904,197
SELF-PROPELLED MECHANICAL PARKING MECHANISM WITH ELEVATOR
Filed July 13, 1954  5 Sheets-Sheet 3
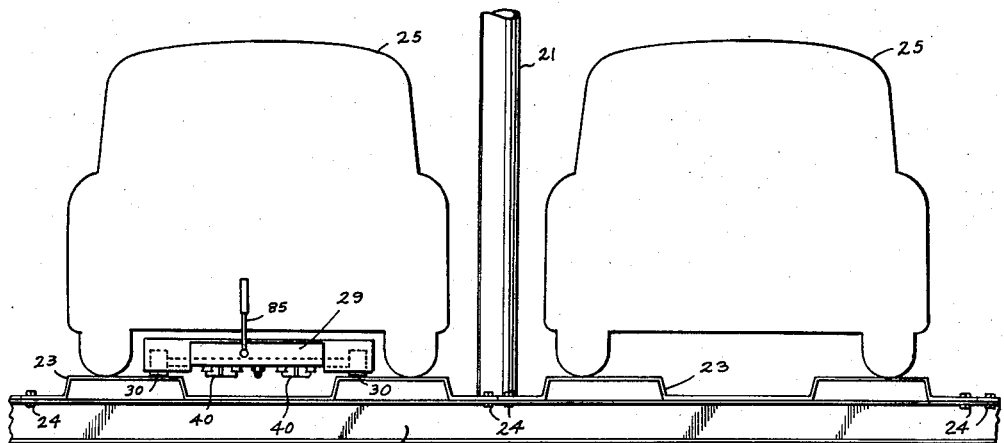
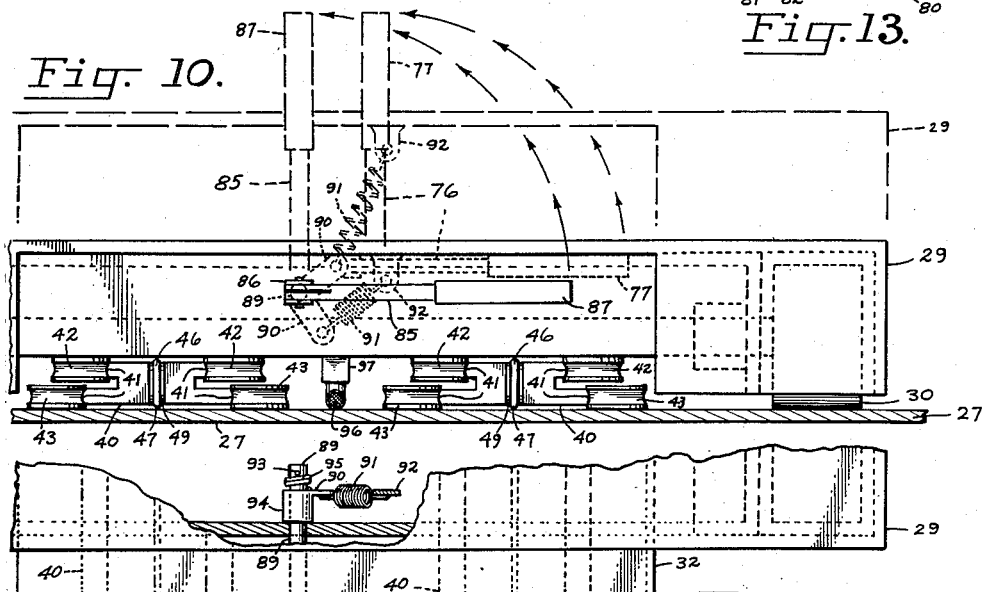
INVENTORS
Victor K. Mayer
BY Bernard B. Asheim
, Atty.

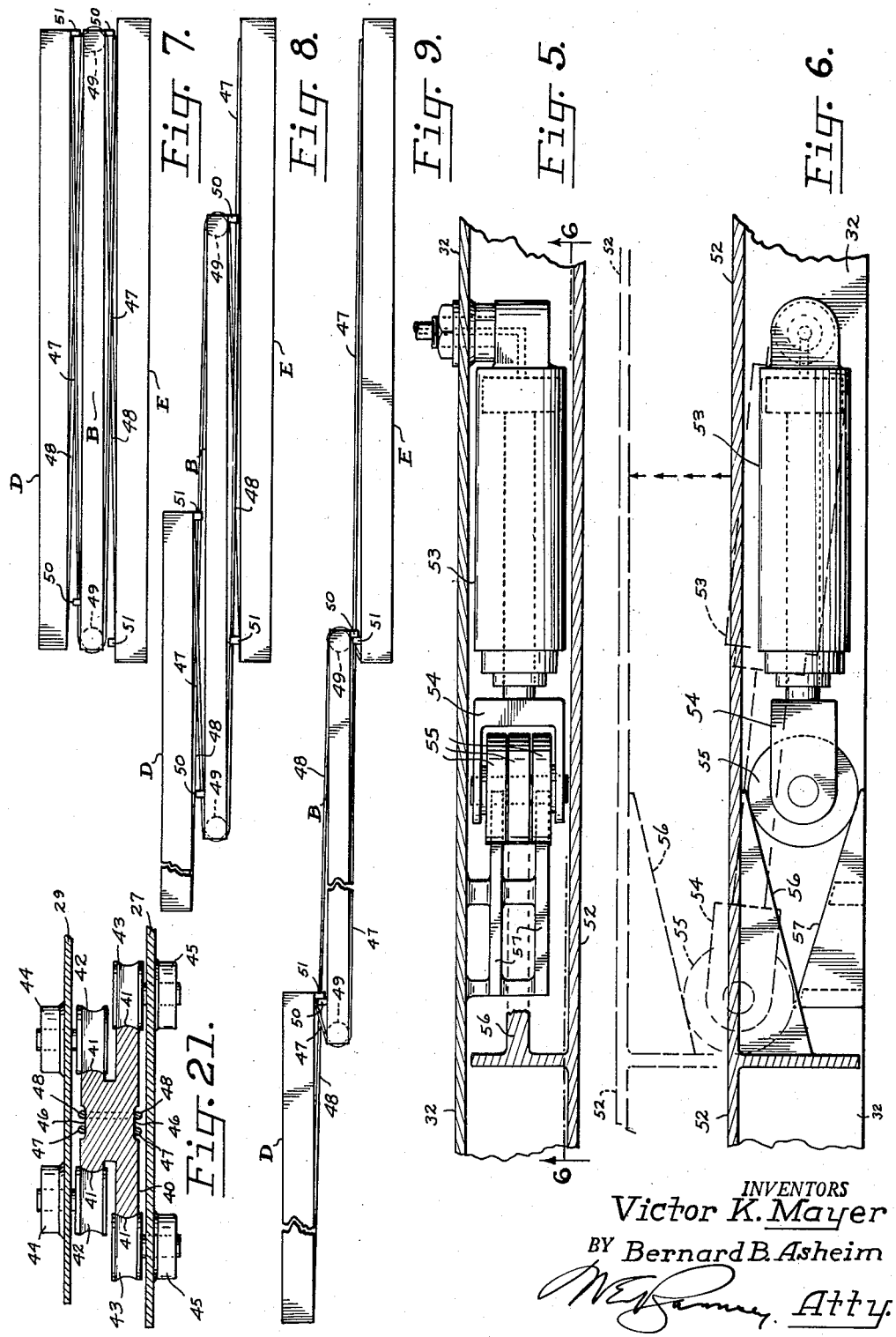

United States Patent Office 2,904,197
Patented Sept. 15, 1959

2,904,197

SELF-PROPELLED MECHANICAL PARKING MECHANISM WITH ELEVATOR

Bernard B. Asheim and Victor K. Mayer, Portland, Oreg.

Application July 13, 1954, Serial No. 442,953

7 Claims. (Cl. 214—95)

This invention relates to a multistory mechanical parking structure, preferably of skeletal type, having an elevator which carries two movable dollies for picking up, delivering and transferring automobiles to and from parking stalls located in the upper stories of the structure. More particularly, the instant invention is concerned with an improved cooperating elevator and dolly structure for use in such an automobile parking facility, one object being to provide novel dolly actuation, travel limit, guide, control and automobile raising mechanism.

In broad terms, our inventive structure includes a multistory garage of skeletal outline arranged with a central elevator well intermediate two wings of the building proper. The elevator structure includes a gantry crane mounted for movement laterally of the elevator well and an elevator platform of the type which is movable vertically of the gantry crane and which carries two self-propelled dollies adapted to move automobiles. Each dolly moves longitudinally off of and on to either end of the elevator platform while picking up and delivering automobiles so as to provide dual service to both wings of the garage. The first or ground floor of the garage defines an entrance and exit for automobiles and the upper floors define parking stalls of simplified construction.

In operation, one of the dollies is moved under the frame and between the wheels of an automobile which has been parked by a motorist at the first floor and left with the brakes set and the doors and windows locked to prevent theft or pilfering. In picking up the locked automobile, an exact positioning on the dolly is accomplished by a novel feeler mechanism hereinafter to be described. After positioning, a vertically movable platform which is carried by the dolly raises the locked automobile clear of the floor and the dolly and automobile move as a unit onto the elevator. The elevator, including the gantry crane, then moves vertically and laterally to a point adjacent a vacant parking stall within the mechanical parking facility. Thereafter, the dolly travels out from the elevator a pre-selected exact distance and the automobile is deposited in the vacant parking stall. In accordance with a preferred embodiment of our invention, the above operation may be varied somewhat in cooperation with the provision of tandem parking stalls for two or more automobiles. Thus, when an automobile is to be retrieved from the back space of a two automobile stall one of the two dollies is employed to move and hold the front automobile until the back stall is emptied by the other dolly. Thereafter, the first dolly replaces the front automobile and the operational sequence continues as before. This use of either single, tandem or combination single and tandem parking stalls provides a flexibility of construction such that each mechanical parking facility erected in accordance with our invention may obtain a maximum use of the available land area.

An adequate understanding of the improvements provided by our invention requires an appreciation of the problems solved thereby. Thus, it is becoming increasingly apparent to merchants, city officials, and the public in general that the central or downtown business districts of most of the large cities in the United States and abroad are close to the automobile saturation point. As an example, the automobile industry of the United States yearly since World War II has broken all existing production records and this production has greatly multiplied the parking and traffic congestion problems. In 1954, there were more than 65% more automobiles on the road in the United States than in 1946. At the same time that automobiles are becoming more numerous, it equally is evident that the central business district today is dependent for its very economic existence upon the provision of adequate off-street parking facilities for shoppers and vehicles. In fact, the failure of a given district to provide adequate parking space can destroy the acceptability thereof as a place to do business. The motorist who cannot locate a parking space quite apparently cannot leave his automobile to shop or otherwise to patronize the central district.

Heretofore, a great competitive advantage has been enjoyed by the concentrated central business district. This advantage today, however, is being dissipated and wasted through parking problems. If these parking problems are not improved materially, engineers and city planners predict that the entire character of most large metropolitan areas will be changed. Instead of the present concentrated central business districts, a large number of localized outlying districts will be offered and, in many cities, this change already is under way.

The instant invention is directed toward a solution of the problems raised by the lack of adequate off-street parking facilities in large metropolitan areas. It thus is of primary concern to business concerns, to metropolitan land owners, and to city officials whose services, property values and taxes are directly dependent upon the parking available to the purchasing public. In causation, parking facilities increasingly are becoming scarce in centralized business districts because of municipal prohibition of on-street parking to facilitate traffic flow and because of the high capital investments represented in a given area of land which logically could be used for off-street parking were a sufficient monetary return available from a parking operation. As the scarcity of parking sends more and more motorists away from the centralized area to do their shopping, these merchants and land owners increasingly are concerned with methods providing increased parking facilities. To meet the problems thus presented, many types of off-street parking facilities have been suggested. For example, multistory parking garages with drive-up ramp spaces, Ferris wheel type parking structures, stagger ramp type driveups, and elevator structures all are old and well known in the mechanical parking art. Initially, multistory ramp type garages with waste ramp space can be eliminated as a solution to the parking problem in centralized areas both because of the waste space occupied by ramps and because of the waste time required to drive automobiles to and from the upper story or distant stalls within such a structure. This brings one to a consideration of mechanical type parking and to a discussion of the economic factors involved in the provision of such mechanical parking facilities.

While developing the instant inventions, we have reappraised the mechanical parking art both as reflected in printed publications and patents and as actually built in place and have found that several factors are of primary importance.

Firstly, the initial or construction cost and the maintenance or upkeep costs of a mechanical parking facility must be such that the average motorist will not be priced off the market by a high parking fee necessitated by the garage owner's high initial or ground rent investments. For example, an average motorist may spend 50¢ to $1.00 to move his automobile from his home to visit a central business district. If he must pay a larger sum to park while shopping in the business district, his expenditure for parking exceeds that for movement, and logically, the motorist may consider this unreasonable. The garage or parking lot owner, on the other hand, must either charge a sufficient price for the parking privilege or must surrender his costly central land area to other than parking uses. Economic surveys directed toward this phase of the problem have revealed that the maximum initial investment for parking space in a mechanical garage cannot exceed $1,200.00 per stall if parking costs are to be kept competitive yet the initial investment is to produce sufficient income. The structures of our inventions meet these economic reqiurements and, in fact, can be utilized in the construction of a mechanical garage for substantially less than $1,200.00 per parking stall.

In line with the above reasoning, one object of our invention is to provide a mechanical parking facility with gantry crane, elevator, and dolly structure which are simple, inexpensive to fabricate, flexible in design to meet varying conditions, and reliable in operation. To this end, our inventive mechanisms are best used with a building structure which is substantially preformed and prefabricated and in which the structural elements are standardized, interchangeable, and can be assembled with minimum or with no welding to allow later disassembly and movement should a leased land area be reclaimed. Further, the parking stalls in our garage can be provided either singly or in tandem style and with a central elevator servicing two opposite wings in order more efficiently to utilize the available land area in a centralized business district. By way of example, our inventive structure so utilizes a given land area that a standard 100 x 100 ft. lot will accommodate two tandem type parking wings and a central elevator yielding parking space for 48 automobiles on each floor above the ground floor.

One important object of our invention is to provide a self-propelled dolly for use with a mechanical parking facility, which dolly is movable onto and off of either end of an elevator to park and pick up automobiles located on either side of a central elevator well. This dolly, as later will be made apparent, can service either single or tandem type parking stalls and the operational control thereof can be manual, semi-automatic or fully automatic as desired.

In a dolly of our improved type, it is a further inventive object to provide a novel free floating beam type guide whereby the dolly is restricted to movement in a straight line only, thereby allowing the elevator and dolly cooperatively to be utilized to align an automobile which initially may be left by a motorist at an oblique angle. That is to say, a motorist entering a parking structure does not always leave his automobile exactly parallel to the longitudinal dimension of the elevator or normal to the entering edge of the elevator. When such an automobile is to be picked up by the dolly and carried aboard the elevator, the automobile first must be aligned with the longitudinal axis of the elevator to insure later accurate alignment within the narrow parking stall. This initial alignment conventionally is accomplished by moving the dolly under the near end of the automobile, lifting that end only clear of the floor, and moving the elevator laterally to one side or the other until the car is straight and in alignment. Thereafter, the near end of the automobile is dropped to the floor, the dolly is moved completely under the chassis and between the wheels of the automobile, and the parking sequence procceds in a normal manner with the dolly carrying the automobile. With the free floating beam mechanism which interconnects the elevator and dolly of our invention, this operation is enabled to proceed quickly and efficiently without unduly straining the operating mechanism of either the dolly or the elevator. Further, the dolly is held rigidly against lateral movement during the above described alignment procedure and no friction slides or other delicate or unreliable mechanisms need be employed in the guide structure.

A further object of our invention is to provide a novel automatic means for controlling the movements of an automobile carrying dolly in order to minimize the chance of collision between automobiles which are being parked in tandem and moved onto and off of an elevator. To this end, we provide two mechanisms either or both of which can be employed. Firstly, we have selected a modular distance which is related to the over-all length of the longest automobile which can be parked in the stalls of our garage. The elevator of our invention then is made slightly longer than this pre-elected modular distance to provide a small safety clearance and the self-propelled dolly is constructed somewhat shorter than the elevator. In tandem parking, it is apparent that the dolly must carry an automobile either one or two automobile lengths into a parking stall, which lengths or distances are whole number multiples of the previously mentioned modular distance. Thus, our first automatic means is one which measures the distance travelled by the dolly and stops the same when that distance equals a preselected whole number multiple of the modular distance. That is to say, irrespective of the initial position of the dolly on the elevator, the dolly automatically can be moved, one, two, or more automobile lengths and automatically brought to a stop. This type of automatic control minimizes the use of limit switches and stops in the parking stalls themselves and thus provides a less expensive and a more simple structure requiring a minimum amount of construction complexity and "down time" for repair or adjustment. For the mechanical parking operator, nothing can be more embarrassing than to be required to tell a motorist that he must wait for repairs to the mechanical parking mechanism before his automobile can be retrieved from an upper story.

In conjunction with or instead of the above measuring device to limit dolly travel, our dolly can be equipped with a second type of automatic control. This is a novel feeler means adapted to stop the dolly when physical contact is made with either an end wall or the bumper of a parked automobile. In one form of this provision, two safety feelers are mounted one adjacent each end of the dolly. Each feeler carries a micro-switch, an electric eye trip, or equivalent actuating mechanism which is capable upon physical contact of the feeler with an obstruction or upon a break in an electric eye circuit to stop the motor which drives the self-propelled dolly. In tandem parking, for example, the dolly can be stopped by physical contact with either an end wall of the garage or the bumper of a parked automobile occupying the distant half of a tandem stall. This feeler structure, then, serves another important object of our invention which is to provide a safe, automatic dolly adapted for use with those automatic devices well known to the automatic elevator art, which devices logically can provide a tandem type mechanical parking facility operable automatically by either a motorist or a single attendant from a central location within the structure.

Another object of our invention is to provide a loading feeler for a mechanical parking dolly, which feeler is operable to position an automobile aboard the dolly during loading such that the automobile will not protrude beyond either end of the elevator which carries the dolly. Such a loading feeler, of course, further can be utilized in combination with the aforementioned automatic elevator art to provide what is termed a fully automatic mechanical parking facility.

Yet another object of our invention is to provide an improved hydraulic lift mechanism for use with a longitudinally movable parking dolly, whereby four spaced wedge type raising mechanisms are actuated by a common hydraulic pump to lift and lower an automobile. One advantage of this lift mechanism is that the hydraulic pump is carried by the dolly, thus eliminating the necessity of dragging and retrieving hydraulic lines during actuation of the dolly.

A further object of our invention is to provide a hydraulically actuated self-propelled dolly which is capable of movement in either direction longitudinally of the dolly, said hydraulic actuation being electrically controllable from a distance by means including a rotatable drum carrying a cable which uniformly is payed out and reeled in during operational movement of the dolly.

The instant invention is related to several inventions having a common assignee identified as follows: Modular Parking, Serial No. 444,755, filed July 21, 1954, now abandoned; Stagger Stall Parking, Serial No. 442,952, Patent No. 2,815,133; Elevator for Mechanical Parking, Serial No. 442,954, Patent No. 2,816,624; and Hydraulic Piston Parking Dolly, Serial No. 448,621, Patent No. 2,815,136.

The above and other advantages, objects and capabilities inherent in and encompassed by our invention will become apparent from the ensuing description taken in conjunction with the accompanying five sheets of drawings, wherein:

Fig. 2 is a partial plan view showing one-half of an elevator together with a self-propelled dolly and an automobile carried thereby, portions of the structure being broken away to reveal details of the hydraulic actuation mechanism carried by the dolly;

Fig. 3 is a side view of the mechanism shown in Fig. 2 better illustrating the relative positions of the wedge type raising mechanism, the cable winding drum, and the safety and limit feelers which provide one type of dolly control for our invention;

Fig. 4 is a partial end section view through two adjacent parking stalls in our mechanical parking facility, one stall being occupied by an automobile and the other stall being occupied by a self-propelled dolly and an automobile;

Figs. 5 and 6 are related partial top and side views of the wedge type lifting and lowering mechanism associated with each of the four corners of a self-propelled dolly in order to raise and lower an automobile;

Figs. 7, 8 and 9 are related diagrammatic representations illustrating a sequential movement of a dolly and a free floating beam guide mechanism from a position on the elevator in Fig. 7 to a position completely extended in Fig. 9;

Fig. 10 is an end section detail and Fig. 11 is a related plan detail of one end of a self-propelled dolly showing the safety limit feeler and loading limit feelers both at rest and, by movement arrows and diagrammatic outline, in the raised or active positions;

Fig. 12 is a detail view of one of the safety limit feelers showing the micro-switch construction associated therewith;

Fig. 13 is a detailed view of the loading limit feeler showing, by arrows, the direction of movement of the various parts during actuation of the feeler from a rest to an operative or active position;

Fig. 14 is a plan detail view, taken substantially on the line 14—14 of Fig. 3, showing the rotatable drum means and electric cable which we employ to control the actuation of each self-propelled dolly from a distance;

Fig. 15 is a side detail, taken substantially on the line 15—15 of Fig. 14, further illustrating the rotatable drum means and the manner in which electrical connections are brought thereto from a distance;

Fig. 16 is a small detail, taken substantially on the line 16—16 of Fig. 15, showing the attachment mechanism for joining one end of the electric cable to a dolly in order to prevent kinking and fouling of the cable;

Fig. 17 is a schematic diagram of the hydraulic system which functions both to move a dolly in either direction longitudinally of the major axis of the dolly and to actuate the wedge type lift mechanism by which an automobile is lifted clear of the floor;

Figure 20:
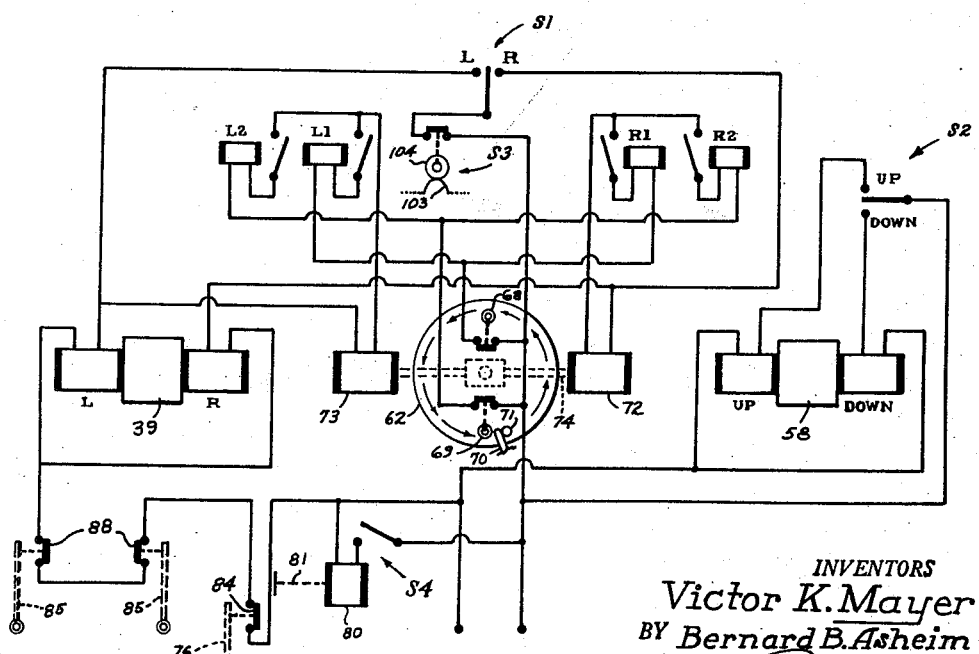

Fig. 20 is a wiring diagram showing one type of push button selector circuit which can be employed with our automatic control means to start and stop a dolly movement, to actuate the lift mechanism associated therewith, and to effect a movement of the loading limit feeler by which an automobile is positioned aboard a dolly; and Fig. 21 is a detail view in section, taken substantially on the line 21—21 of Fig. 11, showing one of the free floating guide beams and the roller and cable centering mechanism associated therewith.

Figure 1:
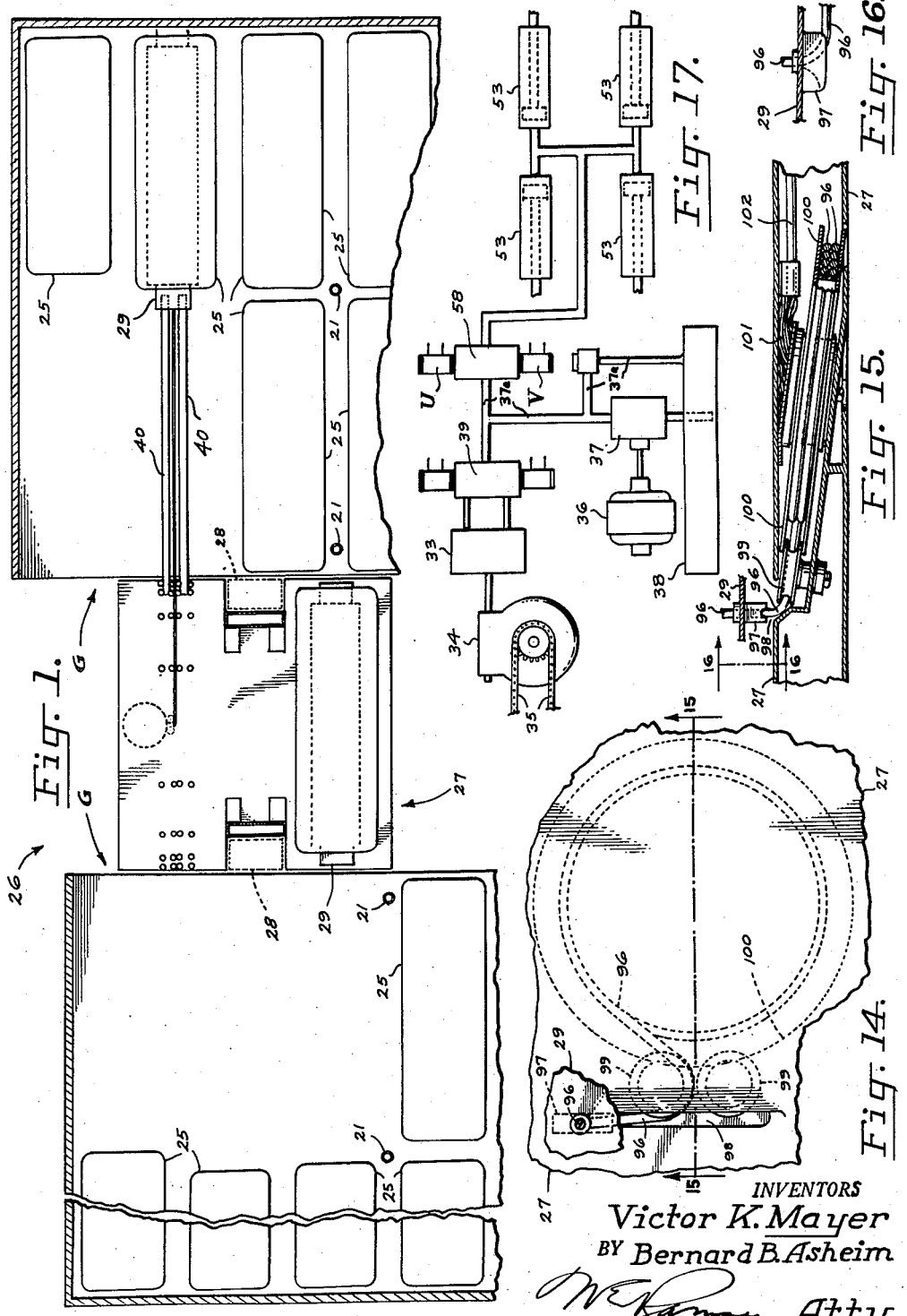
Fig. 1 is a partial plan view of a mechanical parking structure in which are embodied our inventive structures, this view showing a portion of two wings of a parking structure with an elevator therebetween and with a combination gantry crane and elevator occupying the well so as to service tandem parking stalls located in each of the wings.

In Fig. 1, there is illustrated a partial plan view looking down upon a portion of one of the upper stories of a multistory mechanical parking facility. In accordance with economical construction and accepted architectural design, it will be noted that the garage G is skeletal, functional, and simple to the end of providing a utilitarian structure. Thus, a comparison of Figs. 1 and 4 will reveal that the structural elements of the parking facility consist simply of a number of columns 21 on which are supported laterally extending floor beams or girders 22. It is preferable, where rolled steel floor sections are to be employed in the construction of our facility to utilize inter-changeable and identical prefabricated floor sections such as those shown at 23 in Fig. 4. These floor sections 23 are best formed of rolled steel and each section is identical with every other section so as to minimize fabrication costs. In assembly, nuts and bolts 24 preferably are employed so as to speed fabrication and, coincidentally, so as to allow disassembly of the structure should movement thereof be required at a later date.

In erecting a structure in accordance with our invention, we prefer to span the distance between the rows of columns 21 with three identical floor sections 23. Thus, each floor section 23 defines the length and width of one parking stall and, with two sections laid end to end for a width of three sections, three tandem parking stalls are defined between rows of columns. In effect, this means that the strength of the beams or girders 22 must be such as to support three automobiles intermediate the columns where the girders are arranged at the ends of each modular floor section. A more detailed description of the three car modular construction is set forth in the specification forming a part of the previously identified application entitled Modular Parking, now abandoned.

Returning to Fig. 1 of the drawings, it will be seen that we have provided tandem type parking stalls wherein two automobiles can be parked bumper to bumper as indicated by the numerals 25. Intermediate two wings of the garage G is an elevator well 26 in which a combination gantry crane and elevator 27 is arranged for movement both laterally and vertically of the structure. The details of the gantry crane and elevator proper are not of concern to the instant disclosure but the details thereof are explained and claimed in our aforementioned Patent No. 2,816,624 entitled Elevator for Mechanical Parking. Suffice to say, the elevator rides vertically on movable columns or towers 28 and the gantry crane of which the towers 28 are a part moves laterally across the elevator well 26 on large wheels which ride a horizontal track disposed adjacent the lower level of the elevator well 26. The elevator 27 is provided with two self-propelled wheeled dollies 29 one of which is shown aboard the elevator and one of which is shown in the rearmost of a tandem parking stall in Fig. 1. It is these dollies which form the subject matter of the instant invention.

In orientation, it will be seen that the above general description relates to a multistory mechanical parking facility one of the upper stories of which is shown in Fig. 1. The lower or ground level of the structure, on the other hand is provided with at least one entrance and exit way or tunnel where automobiles are left by motorists to be parked and are picked up by motorists when retrieved. It is the function of the elevator and gantry crane which we generically term an "elevator" and designate by the numeral 27 to move the automobiles vertically and laterally within the mechanical parking structure. It is the companion function of the dollies 29, both of which are identical, to pick up automobiles, move them into and out of parking stalls, and onto and off of the elevator.

Turning now to a detailed description of a dolly proper, Figs. 1 to 4, inclusive, point up the fact that the overall dimensions of a dolly must be such that it can ride under the axles and between the wheels and tires of a standard automobile. Where the mechanical parking structure services American made automobiles, an exemplary dolly may be 18.5 ft. in overall length by 6.5 inches high by 43 inches wide. In certain other countries, such as the European countries, a smaller dolly is necessary since the dimensions between the wheels and the overall length of the standard European automobile will be less.

We prefer to equip each of the dollies 29 with eight smooth, unflanged roller wheels 30 keyed to live axles 31 which, in turn, are journaled in fixed frame members 32. The wheels 30 preferably carry a nylon or rubber tread in order to roll smoothly on a flat surface such as the floor of elevator 27 and the concrete slab normally provided as the first floor of a mechanical parking structure.

To propel each of the dollies 29, we prefer to interconnect an hydraulic motor means 33, a gear reduction system 34, and a sprocket and chain mechanism 35, which latter mechanism operatively is joined to at least two of the axles 31 as best shown in Fig. 2. To provide pressure fluid for the hydraulic motor 33, an electric motor 36 drives a pump 37 and fluid is drawn from and returned to a reservoir 38. Such fluid is fed under pressure to the motor 33 and is returned therefrom via the conduits shown in Figs. 2 and 17. An appropriate three-way valve is shown at 39 where control is provided by oppositely acting solenoids designated as L and R. As will be understood, the letter L signifies Left and the letter R signifies Right so that energization of the solenoid L will open the ports of the control valve 39 to actuate the reversible hydraulic motor 33 and move the dolly 29 to the left in the drawings. An energization of the solenoid R, on the other hand, reverses the valve 39 and the operation of the hydraulic motor 33 to move the dolly to the right in the drawings. When both of the solenoids L and R are de-energized, the control valve 39 is spring biased to a central position blocking all flow to the hydraulic motor 33 in definition of a stop position.

As explained in the introductory portion of the instant specification, it is essential that each of the dollies 29 be guided accurately and positively so that the movements thereof are restricted and constrained to straight line travel. To this end, we have shown in Figs. 1, 2, 3 and 10 a novel free-floating beam type guide mechanism which is best provided in mated parallel pairs for each dolly. Each of these beams 40 is formed as a straight structural steel member not unlike the letter H in cross section laid on its side (see Figs. 21 and 10). The protruding side surfaces 41 of each beam are rounded so as to mate with rounded sheaves or rollers 42 and 43. The rollers 42 are journaled upon and are carried by the underside of the dolly 29 as at 44 whereas the rollers 43 are journaled upon and carried by the upper surface of the elevator 27 as at 45. The beams 40 constitute a guide means in the construction, whereas the rollers 42, 43 function as a retaining means defining a path for each beam or guide means relative to the elevator and the dolly and confining the beams to movement in this path. In practice and as is shown in Fig. 2, the rollers 42 and the rollers 43 are provided in mated pairs arranged at intervals along substantially the entire length of the dolly and the elevator. This type of journaled mounting for the free floating beams 40 provides no vertical support for the dolly but, instead, provides only lateral support to resist canting or side sway of the dolly while the dolly is at rest and during movement in a direction longitudinally of the major axis of the dolly.

Since no rigid structural connection is provided between the free floating beams 40 and either the dolly 29 or the elevator 27, it is apparent that the beams will move back and forth as the dolly moves back and forth onto and off of the elevator. This is one reason we term the beams 40 "free-floating" and is a basic reason for the provision of a self-centering cable device. The latter device interconnects each beam 40 and the dolly and the elevator so that the travel of a beam is exactly one-half the dolly travel during any given movement in either direction. In Figs. 10 and 21, it will be noted that each of the beams 40 is notched, as at 46, both top and bottom so as to accommodate centering cables 47 and 48. These cables are reeved over sheaves 49 journaled one in each end of each of the beams 40. The ends of the cables 47 and 48 are secured to the dolly and elevator in similar manner except that the cable 47 is secured to the right ends of these elements and reeved about the left end of a beam whereas the cable 48 is secured to the left ends of the dolly and elevator and reeved about the right end of the beam 40. This feature of our invention now will be explained in more detail.

Figs. 7 to 9, inclusive, illustrate by means of a diagrammatic representation, a typical extension or centering movement of one dolly D, beam B, and elevator E. As therein shown, the cable 47 is secured at one end to the right end of the dolly D, is reeved about the sheave 49 carried at the left end of the beam B and is secured at its other end to the right end of the elevator E. As the dolly D moves to the left, cable 48 which is secured to opposite ends of the dolly and elevator, respectively, and is reeved about a sheave at the opposite end of the beam and is thus allochiral with respect to the cable 47) causes the beam 40 to move therewith but to traverse only one-half the distance covered by the dolly. In a return movement, the cable 47 carries the beam B with the dolly D so as to make certain that the beam once more is centered on the elevator E when the dolly is centered thereon. Thus, each of the beams B moves back and forth with a dolly movement yet the beam traverses only one-half the total distance traversed by the dolly. In Fig. 7, the dolly is shown aboard the elevator, in Fig. 8 partially extended, and in Fig. 9 the dolly is fully extended from the elevator the limit of travel permitted by the beam B.

In conjunction with the above described self centering structure, it may be desirable to provide an extreme mechanical type limit stop as shown in Figs. 7 to 9 inclusive. These mechanical limit stops take the form of mated projecting knobs 50 and 51, the projections 50 being carried by the beam B and the projections 51 being carried by the dolly D and the elevator E. In the fully extended position shown in Fig. 9, the limit knobs 50 and 51 mate to stop all movement of the dolly D relative to the beam B and elevator E. In practice, we prefer to so arrange the knobs 50 and 51 that the extreme limits of movement shown in Fig. 9 ordinarily or normally will not be reached except in the case of a malfunction of the dolly propelling and stopping mechanism. Thus, it is the function of the limit knobs to prevent an override or runaway of the dolly D should inadvertent erroneous operation or malfunction of the dolly propelling mechanism ever take place.

In combination, the above described free-floating beam type guides and cable centering mechanisms constrain and restrain the dolly movement to straight line travel and assure the continuous movement of the free-floating beams 40 or B with the dolly 29 or D. These features allow the elevator and the dolly cooperatively to straighten or align an automobile which may be left by a motorist on the lower floor of our mechanical parking structure parked at an angle or cant to the longitudinal axis of the dolly. Thus, it cannot be expected that a motorist entering a mechanical parking structure always will leave his automobile parked exactly parallel to the longitudinal dimension of the dolly and elevator. An automobile which is at a slight cant or angle first must be aligned before it can be lifted or carried aboard the elevator. With our structure, such an alignment is accomplished by moving the dolly under the near end of the automobile (that end nearest the elevator), lifting that end clear of the floor, and moving the elevator laterally to one side so as to skid the dolly sideways until the automobile is straightened. When the elevator is moved laterally with the dolly extended, it is apparent that a considerable lateral bending and shear force is applied to the dolly and beam mechanism. This force tends to bend or twist these parts relative to the elevator. With the free-floating beam type construction of our invention, however, all such twist or bend is resisted by structure of adequate strength and the elevator can be moved laterally while the dolly is extended full length without damage or undue strain to either the dolly or the free-floating beam mechanism. Further, in contrast to previous dolly mechanisms, an automobile can be lifted and moved laterally into alignment even when the dolly is extended two automobile lengths from the elevator. That is to say, it is entirely practical with our inventive mechanism to allow two motorists to drive into the entrance to the mechanical parking structure and, simultaneously, to lock and leave their automobiles bumper to bumper. Thereafter, the dolly can straighten and load the first automobile and straighten and load the rearmost automobile sequentially, even though both automobiles are locked with the brakes set. Locking the automobile, of course, is intended to prevent unauthorized tampering or theft and is a good service selling point for the operator of our mechanical parking facility.

Continuing with a two automobile parking operation, one dolly has first aligned and then carried the near or first automobile onto the elevator and, after lateral movement of the elevator, the second dolly has been extended the required distance and straightened and the second automobile. Thereafter, the second automobile is moved aboard the elevator by the second dolly where both automobiles rest side by side. This type of loading speeds the motorist on his way by allowing him to leave his locked parked automobile and is of particular importance in those locations where rush hour parking is encountered. In large cities, for example, the peak entrance periods for automobiles arriving to be parked in a mechanical parking structure are between 7:30 and 9:00 a.m. in the morning when office workers arrive for work and between 9:30 and 10:00 a.m. when central department and retail stores open for business. The peak removal periods are late in the afternoon when office workers and shoppers alike retrieve their parked automobiles and return home. One objection voiced against previous mechanical parking facilities is that motorists must wait both to park and to retrieve their automobiles during peak periods. With our invention, it now will be evident, such waits are minimized and the mechanical parking operator is enabled to handle a large volume of automobiles in a given length of time.

Turning now to the mechanism by which each of the dollies 29 raises an automobile clear off the floor, we have shown in Figs. 2, 5 and 6 a novel wedge type raising mechanism. Identical units of this mechanism underlie each of the four corners of the vertically movable platform member 52 as shown in Fig. 2. In detail, each of these raising units comprises an extensible hydraulic piston and cylinder unit 53, the piston of which is joined to a bifurcated yoke 54 and the cylinder of which pivotally is mounted upon the aforementioned fixed frame member 32 of the dolly. The yoke 54 carries a three-part roller 55 each part of which is capable of independent rotation for cooperation with the three sections of the two wedge surfaces 56 and 57. The wedge surface 56 is an integral part of the vertically movable platform 52 and the wedge 57 is an integral part of the fixed dolly frame member 32. Thus, as shown in Figs. 5 and 6, when the piston of a hydraulic unit 53 is extended, the rollers 55 rotate upon and wedge the surfaces 56 and 57 apart to raise the platform 52 above the dolly 29. In reverse, when the piston of an hydraulic element 53 is drawn into the cylinder, the vertically movable platform 52 is lowered as the rollers 55 allow the wedge surfaces 56 and 57 to come together in the full line position of Fig. 6. Actuation of all four hydraulic units 53, of course, is accomplished simultaneously in order to raise the platform 52 in a level steady manner. The hydraulic circuit for accomplishing this simultaneous actuation is shown in Fig. 17 and will be described in detail hereinafter.

Referring to Fig. 17 it will be seen that the electric motor 36, the hydraulic pump 37, the reservoir 38, and the conduits associated with these elements all are joined as well to the wedge raising hydraulic units 53 as to the propelling mechanism and motor 33 for the dolly. Thus, the pump 37 is located aboard the dolly to provide pressure fluid via the illustrated conduit to a three-way valve 58. At this valve, an actuation of one of the two solenoids U or V causes the four hydraulic piston and cylinder units 53 simultaneously to be extended or retracted through multibored conduits 37a. The letter U signifies that solenoid which raises or causes the wedge mechanism to move in an up direction and the letter V signifies the down solenoid as more fully will appear by an inspection of Figs. 17 and 20. In summary, the mechanism shown in Fig. 17 and in the central portion of Fig. 2 is termed a "hydraulic means" all of which is carried by the dolly selectively for moving the dolly longitudinally in either of two directions and for moving the platform of the dolly vertically up or down.

Figure 18:
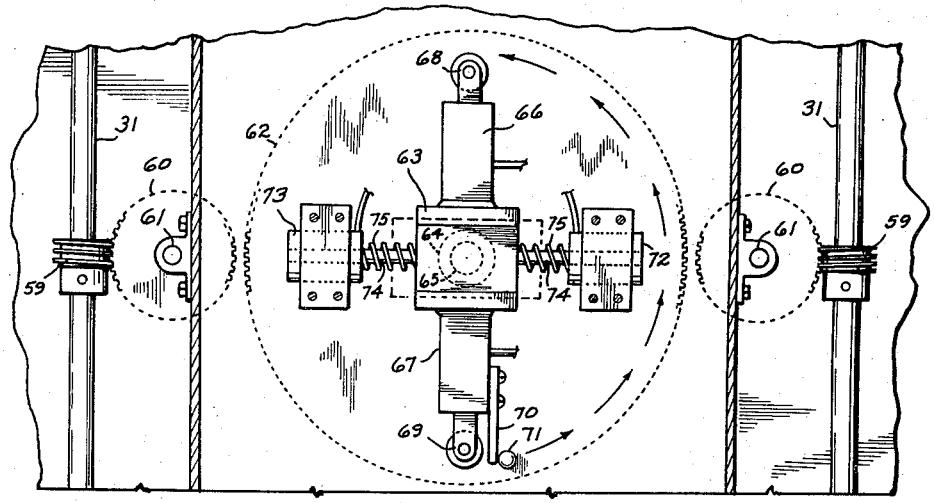
Figs. 18 and 19 are related plan and side views, respectively, both views being somewhat in section and showing the automatic control means which we employ, sequentially, to initiate a movement of a dolly and to stop such movement after the dolly has travelled a preselected modular distance.
Figure 19:
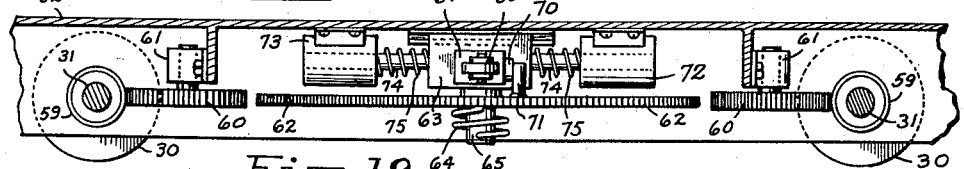

In Figs. 18 and 19, we have shown a rotatable gear and associated mechanism which is carried on the underside of the dolly and which is adjusted progressively by progressive travel of the dolly. This mechanism functions automatically to stop the dolly when the distance traversed is equal to a preselected standard modular distance. To this end, it will be noted that each of two of the axles 31 of the dolly carry a worm gear 59. These worm gears mesh with similar idler gears 60 journaled as at 61 on the fixed frame member 32 of the dolly. Intermediate the two idler gears 60, a large control gear 62 is journaled, as at 63, on a longitudinally movable slide member. This slide mounting 63 allows the control gear 62 to be moved to the right or left in Figs. 18 and 19 to mesh, selectively, with either of the idler gears 60 and the axle 31 associated therewith. Beneath the surface of the control gear 62, a circular type return spring 64 operatively bears upon the fixed journal rod 65 upon which the gear 62 rotates. This spring exerts a continuous return force in a direction opposed to the arrows of Fig. 18.

In cooperation with the above structure, two fixed arms 66 and 67 are secured to protrude from opposite sides of the movable slide member 63. The arm 66 slidably carries the movable switch blade 68 of an electric switch and the arm 67 similarly accommodates the movable blade 69 of a second electric switch. Additionally, the arm 67 has fixed thereto a stop arm 70. A protruding actuation pin 71 is carried adjacent the periphery of the measuring gear 62 for cooperation with the three elements 68, 69 and 70.

Affixed to the underside of the dolly frame 32, we provide a right movement solenoid 72 and a left movement solenoid 73. These solenoids each carry a movable armature 74, both of which are joined to the movable slide member 63, previously mentioned. Additionally, two oppositely acting centering springs 75 return the slide 63 and the gear 62 to a central position when both the solenoid 72 and the solenoid 73 are inactive.

In operation of the above described measuring mechanism, the return spring 64 normally and yieldably holds the gear 62 in such a position that the actuation pin 71 rests against stop arm 70. When, however, either of the solenoids 72 or 73 are actuated, the slide 63, the arms 66 and 67, and the gear 62 all are shifted to the right or left as shown in Figs. 18 and 19. Presuming a shift to the right, the periphery of the gear 62 will mesh with the right idler 60 so as to cause the control gear 62 to rotate with the corresponding right axle 31 and wheels 30 of the dolly due to movement along the floor or over the elevator. As the gear 62 rotates, it carries the actuation pins 71 in a circular path as indicated by the arrows in Fig. 18. Thereafter, one of the electric switches controlled by the blades 68 and 69 being active, the coaction of the pin 71 and the roller or terminal end of the switch blade will open the active switch. It thus will be understood that the switches of which the blades 68 and 69 are members are normally closed switches opened by the movement of the corresponding switch blade. The utility of the above described mechanism will be set forth with respect to Fig. 20 of the drawings hereinafter.

In Figs. 3, 10, 11, 13 and 20, we have shown a loading limit feeler means for use in positioning an automobile aboard a dolly during the loading or pick-up operation on the first floor of the mechanical parking facility. This means includes a feeler arm 76 which carries a pivot plate 77 adjacent one end thereof and is pivotally mounted, as by the two-way pivot 78, adjacent the other end thereof. A recess 79 is formed in the floor of the dolly 29 adjacent one end thereof to shield and house the above described portions of the feeler mechanism. Referring in particular to Figs. 11 and 13, it will be seen that a solenoid 80 having an arm 81 and a return spring 82 pivots a crank arm 83 to which the aforementioned feeler arm 76 is fixed. When the solenoid 80 is energized, the arm 81 is moved to the right in Fig. 13 compressing the return spring 82 and causing the feeler arm 76 to rise to the vertical position shown in dashed outline. De-energization of the solenoid 80, on the other hand, returns the parts to the full line position of Fig. 13.

In that portion of Fig. 11 which is broken away, a microswitch 84 is revealed in position for actuation by the pivot plate 77. Thus, physical contact of the pivot plate 77 with an object causes the plate to pivot in actuation of the microswitch 84. In practice, the microswitch 84 is joined to an electric control circuit for the dolly actuation mechanism such that movement of the pivot plate 77 against the switch 84 will cause the dolly to stop. In the initial loading of an automobile aboard the dolly, the solenoid 80 is actuated to move the feeler arm 76 into an operative position and, as the dolly moves under the axles and between the tires of the automobile, the pivot plate 77 eventually will contact the bumper of the automobile and stop the dolly. As will be understood throughout this specification, the dolly is stopped by closing a three-way valve which controls a hydraulic motor. Thus, the dolly movement cannot be stopped immediately. An additional four to six inches of travel normally will take place after the switch 84 is actuated to close the control valve and before the dolly can come to a complete halt. For this reason, the pivotal mount 78 is a two-way pivot as a comparison of Figs. 11 and 13 will reveal. This two-way pivot allows the feeler arm 76 to give slightly after physical contact with an obstruction in accommodation of the four to six-inch travel still to be executed after the microswitch 84 is actuated. A complete loading cycle of the dolly using the mechanism above described will be set forth with reference to the operation of the dolly and the electric circuit of Fig. 20.

In conjunction with or in place of the rotatable mechanism shown in Figs. 18 and 19, each of the dollies 29 carries a pair of movable safety or end feeler means as shown in Figs. 3, 10, 11, 12 and 20. These feeler means are provided in pairs located one adjacent each end of each dolly 29 and all are identical in function so the structure of but one will be described in detail. In essence, each safety feeler includes a feeler arm 85 which is pivotally mounted, as at 86, and which carries, adjacent the free end thereof, a pivot plate 87 the function of which is to operate a microswitch 88. The pivotal mount 86 is fixed to a rotation rod 89 journaled in the fixed frame member 32 of the dolly. Progressing toward the center of the dolly in Fig. 11 to that point where the movable platform portion of the dolly overlies the fixed frame mechanism 32, the rotation rod 89 carries a crank arm 90. The crank arm 90, in turn, is joined to one end of a spring 91 the other end of which is secured, by an ear 92, to the underside of the movable platform portion of the dolly (see Fig. 10). Thus, when the platform of the dolly 29 is raised vertically, the ear 92 is carried therewith. Movement of the ear 92, in turn, will tension the spring 91 yieldably to raise the safety feeler arm 85 and associated mechanism from the full line rest position of Fig. 10 to the dashed line operative position of the same figure.

Referring again to Fig. 11, it will be seen that the inner end of the rotation rod 89 is equipped with a protruding pin 93 and a collar 94 between which a compression spring 95 is trapped. In cooperation therewith, the safety feeler arm 85 is made angular to reach up over the end of the dolly and is pivotally mounted as previously mentioned, at the point 86. Thus, the rotation arm 89 is mounted for limited movement longitudinally of the axis thereof and the feeler arm 85 additionally is mounted for pivotal movement about the point 86. This mechanism provides a two way give for the feeler arm.

In function, the microswitch 88 is joined to the electric control circuit for the dolly movement in such a manner that actuation of the switch will cut off the hydraulic motor via closure of a valve to stop the dolly movement. Assuming this mechanism is to be utilized merely as a safety device, actuation of one of the feelers would result should the dolly 29 be moved against an end wall or other obstruction within the mechanical parking facility. Such a physical contact of the pivot plate 87 with an obstruction would actuate the microswitch 88 and stop the dolly movement. Since the dolly will move the aforementioned four to six inches after an electric impulse dictates a stopping movement thereto, the protruding pin 93, collar 94, and compression spring 95 are provided to function as a give or limited movement mechanism preventing damage to the feeler device. On the other hand, should the feeler be used as an automatic centering device within the parking stalls, the obstruction which is met will be an overhanging obstruction such as the bumper of a car. The pivotal mount 86 then allows the safety feeler arm 85 to pivot while the dolly moves the required four to six inches of additional travel in order to prevent physical damage to the parts. A more detailed description of the function of the safety end feelers will be set forth with respect to Fig. 20 and the operation of the entire dolly mechanism hereinafter.

The remaining structural feature of our improved dolly and elevator is best described with reference to Figs. 3, 14, 15 and 16. Thus, it will be recalled that each of the dollies is a self-propelled mechanism in which the motor drive is provided by a hydraulic pump which is electrically actuated. Additionally, the various safety and loading feelers and the start and stop functions of the dolly all are controlled electrically. To effect such an electrical control from the elevator or from a central position within the mechanical parking facility it is necessary that an electric control cable interconnect the elevator 27 and each of the dollies 29. The manner in which such an electrical interconnection is effected in order, at the same time, to accommodate dolly movement in either of two directions longitudinally of the dolly now will be explained.

In Figs. 3 and 16, an electric control cable 96 is shown joined to a dolly 29 by means of a recessed connector 97. This electric control cable 96 depends from the bottom of the dolly and is threaded through a slot 98 in the floor of the elevator, around one of two idler sheaves 99, and about a rotatable drum means 100. As will be understood by those skilled in this art, the control cable 96, after it is reeved about the drum 100, is joined by brushes to a number of electrical leads 101, each of which leads is one of the lines shown in Fig. 20. Such a joinder is a conventional method of joining a fixed electrical contact to a movable electric contact. The leads 101 are gathered at a fixed cable 102 the far end of which may be located at a control panel either aboard the elevator 27 or in a central location within the parking facility.

As will be appreciated, it is necessary that the rotatable drum 100 effect a uniform paying out and reeling in of the electric control cable 96 in order that the control cable will not become fouled up or tangled as the dolly moves back and forth across the elevator and into the parking stalls of the mechanical parking structure. We have assured such a uniform paying out and reeling in of the cable by disposing the axis of rotation of the drum 100 at an oblique angle to the floor of the elevator as shown in Fig. 15 and by coordinating therewith, the aforementioned idler sheaves 99, slot 98 and recessed connector 97. In Fig. 14, the direction of dolly movement is longitudinally of the slot 98. It thus will be appreciated that the control cable 96 will cooperate with the idler sheaves 99 so as to move onto or off of the drum 100 without kinking or breaking and in a uniform manner, the drum 100 being provided with a strong return spring so as to take up all slack in the electric control cable. An additional reason for the improved oblique rotational axis of the drum 100 and associated mechanism will be appreciated when it is recalled that the floor of the elevator 27 is of limited thickness. This limited vertical dimension is vital since the lower surface of the elevator will come in contact with the bottom of the elevator well 26 when the elevator is in a lowermost position. Were the drum 100 arranged for rotation about a horizontal axis, the size of the drum would require that it protrude below the lower surface of the elevator 27 where damage could result when the elevator reached a lowermost position. On the other hand, were the drum 100 disposed for rotation about a pure vertical axis, a complex system of pulleys or sheaves would be required to bend the cable about in order to effect a uniform paying out and reeling in of the cable during dolly movement. We thus have found that an oblique axis of rotation is the best and most logical axis of rotation for the drum 100 and we deem the structure associated therewith to be a feature of our invention.

The operation of our novel elevator and dolly structure will be explained with reference to the schematic wiring diagram of Fig. 20. In this figure, the various electrical and mechanical elements bear the same reference numerals as the corresponding parts in the remainder of the drawings. Thus, 58 is the three way valve for controlling the wedge raising mechanism, 72 and 73 are right and left movement solenoids joined to the measuring gear 62, 39 is the three way valve which controls the longitudinal movements and the stopping of the dolly, 80 is the solenoid controlling the loading limit feeler arm, and 85 is the safety feeler arm. In addition, we have shown four electric switches numbered S1, S2, S3 and S4, respectively. S1 and S2 are three-position switches biased toward the neutral center position shown in the drawings. Switch S1 is joined electrically to the solenoids L and R which control the left and right movement valve 39 as previously explained. The switch S2 is joined electrically to the solenoids marked "up" and "down" (these solenoids are identified as U and V in Fig. 17) to control the raising and lowering valve 58. The switch S3 is best formed as a time-delay switch of the type which, when actuated, opens an electric circuit for a preselected length of time and then closes automatically. In practice, this switch cooperates with a protruding knob 103 and a roller 104. Movement of the roller 104 over the projecting knob 103 opens the switch S3 for a preselected time interval (for example five or ten seconds), after which the switch S3 closes automatically. The protruding knob 103 is located on the elevator and the roller 104 and associated switch blade are carried by the dolly in a position for contact with the knob 103 when the dolly is exactly centered on the elevator. Thus, the main feed line to the left and right actuation switch S1 is broken for an instant each time the dolly is exactly centered. This stops the dolly centrally of the elevator yet, after a preselected time delay such as ten seconds, allows the further operation of the dolly by the automatic closure of the switch S3.

The switch S4 is a two-position switch biased to an open or inactive position. When held closed, this switch actuates the solenoid 80 and raises the loading limit feeler mechanism of Fig. 13 to the operative or active position. The symbols L1, L2, R1 and R2 represent the holding solenoids of normally open push button switches. In practice, all of these push buttons and switches are located at a point remote from the dolly and the lead lines thereto are carried by the electric control cable 96, 102 as previously explained with reference to Fig. 15. Each dolly is provided with a separate control panel and series of electrical elements such as are shown in Fig. 20. These control panels may be located at a convenient place aboard the elevator 27 or in a central location on the first floor of the mechanical parking structure.

Assuming that the push button controls for the dollies are located aboard the elevator, an operator normally will stand in the central space of the elevator facing the direction of loading of the automobiles. To effect a manual pick-up of an automobile, the switch S1 is employed to move a dolly from the elevator out and beneath an automobile. Thereafter, the switch S2 raises the platform and the switch S1 again is employed to bring the automobile aboard the elevator. Appropriate gantry crane and elevator control circuits then are actuated to move the elevator platform both vertically and horizontally to a position adjacent a vacant parking stall on one of the upper stories of the structure. It is at this point that the measuring mechanism of Figs. 18 and 19 comes into use.

One of our inventive objects previously was explained to be the provision of a mechanical parking facility of low initial construction and maintenance cost. To this end, it will be noted that the parking stalls shown in Fig.

1 are of simple design and that no limit switches, hydraulic mechanism, or cables are constructed therein. If, in conjunction with this simplicity of construction it is desired to provide an automatic type measuring operation for the dolly 29, the push button circuit of Fig. 20 and the associated measuring mechanism of Figs. 18 and 19 are utilized.

As a first step, a survey is taken of all of the automobiles in the country where the parking facility is located to develop charts or graphs showing the extreme dimensions thereof. From this survey, a standard automobile over-all length and clearance is adopted, such an over-all length to define a modular distance about which the entire parking facility is constructed. For example, we have found that in the United States the over-all length of an automobile will exceed 19 ft. with less than a fraction of 1% of the automobiles now in use. Accordingly, we select the 19 ft. as an exemplary modular distance and, in a preferred embodiment of our invention, construct the parking stalls of Fig. 1, 19 ft. in length and arrange two of them in tandem style to provide an over-all length of 38 ft. for the accommodation of two automobiles bumper to bumper. Additionally, the elevator 27 is constructed approximately 19 ft. 6 in. in length to allow a few inches for a safety factor and the dolly 29 is approximately 19 ft. in length, 43 inches wide and 6½ inches high.

Referring now to Figs. 18 to 20, the worm gears 59, idler gears 60 and gears 62, are proportioned such that a movement of a dolly approximately 19 ft. (one modular length plus the few inches necessary for the dolly to reach the margin of the elevator) will cause the actuation pin 71 to move from the position shown in Fig. 18 to a position where the switch blade 68 is depressed. Similarly, a movement of the dolly 38 ft. plus, or two modular distances, will cause the actuation pin 71 to reach a point where the switch blade 69 is actuated. Minor adjustment of the modular distance can be effected by adjusting the position of the switches 68 and 69 and/or the pin 71.

In Fig. 20 it will be noted that the push button hold solenoids L1, L2, R1 and R2 all are joined to the main electric circuit through the switch blades 68 and 69. In symbolic notation, the symbol L1 indicates a movement of the dolly one modular distance or 19 ft. to the left in the drawings. Similarly L2 represents two modular distances to the left, R1 represents one modular distance to the right and depression of the push button R2 will cause the dolly to move two automobile lengths (two modular distances) to the right in the drawings.

To initiate an unloading operation of the dolly, it will be assumed that the dolly is centered on the elevator and the elevator has stopped adjacent an unoccupied tandem stall with an automobile positioned aboard the raised platform of the dolly. To deposit the automobile in the second stall out, the operator merely depresses the appropriate push button L2 or R2 depending upon which direction of dolly movement is required. For example, the depression of push button R2 completes the circuit through the solenoid R to cause the actuation of the control valve 39 and the dolly begins to move toward the right. At the same time, a circuit has been completed through the right movement solenoid 72 to cause the gear 62 to be moved toward the right and to mesh with the right idler 60 and the right one of the rotatable axles 31.

As the dolly moves to the right, the wheels 30 rotate and the upstanding actuation pin 71 is carried about the periphery of the gear 62 in the direction of the arrows of Figs. 18 and 20. As the actuation pin 71 passes the switch blade 68, no electrical function is performed since this switch is dead and is not in the circuit at the moment. On the other hand, as the actuation pin 71 contacts the switch blade 69 after a 38 foot travel of the dolly, the circuit is broken and the dolly is stopped. Because the gears 59, 60 and 62 have been proportioned in accordance with the preselected modular distance or automobile length, the dolly is stopped precisely two car lengths or 38 ft. from the initial point aboard the elevator. This result will follow, moreover, irrespective of the original position of the dolly upon the elevator. That is to say, the dolly need not have been precisely in the middle of the elevator when a movement is initiated since the measuring gear will measure the dolly travel rather than measuring the distance from a parking stall to a fixed elevator as would be done were conventional limit switches employed in the parking stalls.

Once an automobile is in the correct preselected position within the parking stall, of course, the switch S2 is actuated to lower the platform and deposit the automobile in the stall. Thereafter, either the switch S1 or the appropriate push button switch is employed to return the dolly to the elevator. As the dolly reaches the center of the elevator, the switch S3 automatically is actuated by the coaction of the protruding knob 103 and the roller 104 to stop the dolly. After a five or ten second preselected time delay, further operation of the dolly can be effected where such is desired.

As previously explained with reference to the safety feeler means 85, the mechanism of Figs. 18 and 19 may be used in lieu of the safety feeler means or both such mechanisms may be employed at the same time. If it is assumed that the safety feeler mechanism 85 is to be employed to position a car within a parking stall, the mechanism of Figs. 18 and 19 is unnecessary. On the other hand, the mechanism is extremely accurate and it not dependent upon the original position of the dolly upon the elevator. It thus may be preferred by some operators to employ both mechanisms whereupon the safety feeler means 85 will come into use only to prevent an accident or inadvertent overrun of the dolly during movement.

The function of the safety feeler 85 and loading limit feeler 76 will be explained with reference to an operation of the dolly wherein the measuring mechanism of Figs. 18 and 19 is not employed. To this end, let it be assumed, that an automobile has been parked in the entrance way to the mechanical parking facility and the motorist has set his brakes, locked the doors of the automobile and left after issuance of a claim check. Should the automobile be at a cant or slight angle with the longitudinal dimension of the dolly, it first will be necessary to align the automobile. To this end, the left end of the dolly as shown in Fig. 3 of the drawings will be moved under the front end of the automobile by employing the switch S1 in Fig. 20. Thereafter, the switch S2 will raise the platform of the dolly to lift the front end only of the automobile clear off the floor. When the dolly platform is raised, it is apparent that both of the safety feeler arms 85 are raised automatically. However, the safety feeler arm 85 which is on the left in Fig. 3 will at this point in the operation be under the approximate center of the automobile and probably will strike an obstruction such as a frame member or the gas tank of the automobile. This contact with a physical obstruction does no harm to the safety feeler arm 85 since the spring 91 merely flexes allowing the feeler arm to remain in a partially raised position until the dolly platform once more is lowered.

To align the automobile, the elevator is moved laterally a slight amount with the dolly extended and with the front end of the automobile raised clear off the floor by the platform of the dolly. Once alignment is effected, the elevator is stopped and the dolly platform is again lowered by employing the switch S2. Thereafter, the switch S1 is actuated to move the dolly full length under the automobile. Just prior to or as this loading of the dolly begins, however, the switch S4 is closed and is held closed so as to raise and make operative the loading limit feeler arm 76 shown in Fig. 13 of the drawings. In the raised position of this loading limit feeler arm, the dolly continues to move under the automobile between the wheels thereof until the pivot plate 77 contacts the front bumper of the automobile to actuate the microswitch 84 and stop the dolly. This feeler actuated stop of the dolly automatically positions the automobile centrally of the dolly since the position of the feeler on the dolly has been arranged to effect such a function. Thereafter, the switch S4 is opened and the spring S2 returns the loading limit feeler arm to its position of rest.

The dolly platform now is raised by actuating the switch S2 and the automobile and dolly are moved, as a unit, aboard the elevator by employing the switch S1. The elevator and gantry crane function in conventional manner and, once adjacent a vacant parking stall in one of the upper stories of the mechanical parking structure, the switch S1 is actuated to move the dolly out into a parking stall. If it is assumed that the vacant parking stall is the front stall of a tandem or two automobile stalls with the back unit thereof occupied by an automobile, the dolly movement will be stopped automatically by the physical contact of the safety feeler arm 85 with the bumper of the parked automobile. This automatic operation is effected by a pivotal movement of the pivot plate 87 against the microswitch 88 to open the main circuit to the control valve 39. Where the automobile is to be parked against the far wall or end member of a parking stall, of course, it is a physical contact of the safety feeler 85 with that end wall which causes the dolly to come to a stop.

As now will be apparent, the electric control cable 96 which is joined to each dolly automatically is reeled in and payed out by the drum 100 during all dolly movements. The uniformity of the paying out and the reeling in of the electric control cable is promoted by the novel drum and pulleys and by the free-floating beam guides which restrict the dolly movement to a straight line. Thus, neither of the dollies is permitted to move laterally during any of the normal operations above pointed out.

In conclusion, it will be seen that we have provided an improved elevator, gantry crane and dolly structure for use in a multistory mechanical parking facility, which dolly is self-propelled and is provided with guiding, actuation, and automatic control mechanism as well as with raising mechanism all of which are of a novel character. Further, it will be seen that the provision of each element of our mechanical device is made with the ultimate objective in mind of a low initial fabrication and a low maintenance cost. At the same time, we have provided a reliability of operation which will increase customer good will and make practical the construction of our mechanical parking facility in many of the central business districts of the United States in alleviation of the acute off-street parking problems thereof.

We claim:
1. In combination, a mechanical parking elevator means having side by side space for carrying two elongated self-propelled vehicle supporting dollies in a combination of vertical and horizontal movement, hydraulic actuation means carried by each of said dollies for moving the same across and at least two dolly lengths beyond said elevator selectively in either direction longitudinally of the dolly, each said dolly having electric means for controlling said hydraulic actuation means at a distance from the dolly, each said electric means including a rotatable drum means operatively carrying an electric cable secured at one end to a dolly, each said drum being journaled about an oblique axis of rotation on said elevator and having coordinated idler means carrying said cable for a uniform paying out and reeling in of the cable during a dolly movement in either of said directions.

2. In combination, an elongated elevator having both vertical and lateral movement, a self-propelled wheeled vehicle supporting dolly carried by said elevator and movable longitudinally in either direction therealong and at least two dolly lengths therebeyond, and free-floating guide means bearing on said dolly and elevator, respectively, and movable with the dolly to restrict the movement of the dolly to straight line travel, said guide means including a pair of spaced, parallel beams, each of said beams moving in retaining means presented by said elevator and dolly.

3. In combination with an elongated elevator having both vertical and lateral movement, a self-propelled wheeled vehicle supporting dolly carried by said elevator and movable longitudinally in either direction therealong and at least two dolly lengths therebeyond, guide means interposed between said dolly and elevator and movable with the dolly to restrict the movement of the dolly to straight line travel, companion rollers carried by said dolly and elevator, respectively, said guide means including a free floating beam movable between said companion rollers and cooperating limit means carried by said dolly, said elevator and said beam to stop the travel of the dolly should the beam become extended substantially full length from the elevator.

4. In combination with an elongated elevator having both vertical and lateral movement, a self-propelled wheeled vehicle supporting dolly carried by said elevator and movable longitudinally in either direction therealong and at least two dolly lengths therebeyond, guide means operatively bearing on both said dolly and elevator and movable at all times with said dolly a distance equal to one-half the dolly travel to restrain such travel to a straight line, said guide means including a pair of spaced, parallel free floating beams having flanges which are movable between companion rollers carried by said dolly and said elevator, respectively, cable means operative in either direction of dolly travel and interconnecting said dolly and elevator over sheaves journaled on said beams to carry the beams with the dolly a distance equal to one-half of the dolly travel, each said beam having a top and a bottom longitudinal groove adapted to accommodate said cable means.

5. In combination with an elevator adapted to move automobiles both vertically and laterally in a parking structure, said elevator having an overall length which exceeds a preselected modular distance related to the overall length of a preselected automobile, a wheeled vehicle supporting dolly movable longitudinally along and beyond either end of said elevator, actuation means for moving said dolly longitudinally beyond either end of said elevator, said dolly being wheeled for movement over a plane surface and carrying guide means for restraining such movement to straight line travel, said guide means including a free floating beam, said beam being movable on rollers carried by said dolly and elevator, said beam moving a distance equal to one-half the distance traveled by the dolly, and automatic control means having a means which is adjusted progressively by progressive travel of said dolly joined to said actuation means and operable to stop said dolly when the dolly moves a distance equal substantially to a preselected whole number multiple of said modular distance.

6. In combination with an elevator adapted to move automobiles both vertically and laterally in a storage garage, said elevator having an overall length which exceeds a preselected modular distance related to the overall length of a preselected automobile, a wheeled dolly movable longitudinally along and beyond either end of said elevator, actuation means controllable from said elevator and carried by said dolly selectively for moving said dolly longitudinally beyond either end of said elevator for distances at least equal to twice said preselected modular distance, and automatic control means having a means which is adjusted progressively by progressive travel of said dolly joined to said actuation means and operable to stop said dolly when the dolly moves a distance equal substantially to a preselected whole number multiple of said modular distance, said means which is adjusted by movement of the dolly including a rotatable gear carrying switch means and movable by means of a solenoid into and out of engagement with a portion of said dolly which rotates during movement of the dolly.

7. In combination with an elevator adapted to move automobiles both vertically and laterally in a storage garage, said elevator having a floor with an overall length which exceeds a preselected modular distance related to the overall length of a preselected automobile, a wheeled dolly movable longitudinally along and beyond either end of said elevator floor, platform means on said dolly movable vertically to lift an automobile clear off said elevator floor, actuation means controllable from said elevator and carried by said dolly selectively for moving said platform means vertically and for moving said dolly longitudinally beyond either end of said elevator for distances at least equal to twice said preselected modular distance, said dolly being wheeled for movement over a plane floor, guide means interposed between said dolly and elevator for constraining such movement to straight line travel, rollers carried by said dolly and elevator, said guide means including a free floating beam movable on said rollers a distance equal to one-half the distance traveled by the dolly, and automatic control means having a means which is adjusted progressively by progressive travel of said dolly joined to said actuation means and operable to stop said dolly when the dolly moves a distance equal substantially to a preselected whole number multiple of said modular distance.

References Cited in the file of this patent

UNITED STATES PATENTS

| | | |
|---|---|---|
| 1,103,796 | McCoon | July 14, 1914 |
| 1,561,348 | Mugford | Nov. 10, 1925 |
| 1,826,116 | Andrews | Oct. 6, 1931 |
| 1,879,713 | Scott | Sept. 27, 1932 |
| 1,973,605 | Buettell et al. | Sept. 11, 1934 |
| 1,988,619 | Buettell | Jan. 22, 1935 |
| 2,016,662 | Aitken | Oct. 8, 1935 |
| 2,051,062 | Turner et al. | Aug. 18, 1936 |
| 2,065,107 | Turner et al. | Dec. 22, 1936 |
| 2,070,792 | Kent | Feb. 16, 1937 |
| 2,073,721 | Wheelock | Mar. 16, 1937 |
| 2,102,995 | Coombs | Dec. 21, 1937 |
| 2,232,726 | Perez | Feb. 25, 1941 |
| 2,602,557 | Sinclair | July 8, 1952 |
| 2,626,065 | Sanders | Jan. 20, 1953 |
| 2,647,647 | Alimanestiano | Aug. 4, 1953 |
| 2,652,938 | Murphy | Sept. 22, 1953 |
| 2,691,448 | Lontz | Oct. 12, 1954 |
| 2,726,774 | Newsom et al. | Dec. 13, 1955 |
| 2,736,015 | Gilvarry et al. | Feb. 21, 1956 |
| 2,788,905 | Grove | Apr. 16, 1957 |